(12) United States Patent
Heijnesson-Hultén

(10) Patent No.: US 7,700,764 B2
(45) Date of Patent: Apr. 20, 2010

(54) METHOD OF PREPARING MICROFIBRILLAR POLYSACCHARIDE

(75) Inventor: Anette Heijnesson-Hultén, Lerum (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 11/443,987

(22) Filed: May 31, 2006

(65) Prior Publication Data

US 2006/0289132 A1    Dec. 28, 2006

Related U.S. Application Data

(60) Provisional application No. 60/694,255, filed on Jun. 28, 2005.

(51) Int. Cl.
*C08B 1/00* (2006.01)
(52) U.S. Cl. .............................. 536/56; 536/30; 514/57; 514/781
(58) Field of Classification Search .................. 536/56, 536/30; 514/57, 781
See application file for complete search history.

(56) References Cited

U.S. PATENT DOCUMENTS 2,368,527 A * 1/1945 Edelstein ..................... 536/56
4,661,205 A 4/1987 Ow et al. ........................ 162/78
5,964,983 A * 10/1999 Dinand et al. .................. 162/27
6,183,596 B1 * 2/2001 Matsuda et al. ................. 162/9
2003/0186036 A1 10/2003 Goodell et al. ............ 428/292.4

FOREIGN PATENT DOCUMENTS

| EP | 0 726 356 B1 | 8/1996 |
| SU | 1639432 A3 | 3/1991 |
| WO | WO 96/24720 | 8/1996 |
| WO | WO 2004/055268 A1 | 7/2004 |

OTHER PUBLICATIONS

Abstract of EP 0 726 356 B1 from EPO on-line data base esp@cenet. date: Aug. 14, 1996.
Abstract of SU 1639432 A3 from EPO on-line data base esp@cenet. date: Mar. 30, 1991.

* cited by examiner

*Primary Examiner*—Shaojia Anna Jiang
*Assistant Examiner*—Michael C Henry
(74) *Attorney, Agent, or Firm*—Robert C. Morriss

(57) ABSTRACT

The present invention relates to a method of preparing microfibrillar polysaccharide comprising treating a polysaccharide in an aqueous suspension comprising an oxidant and at least one transition metal, mechanically delaminating said polysaccharide such that microfibrillar polysaccharide is formed. The invention also relates to microfibrillar polysaccharide obtainable by the method.

16 Claims, No Drawings

METHOD OF PREPARING MICROFIBRILLAR POLYSACCHARIDE

This application claims priority based on U.S. Provisional Patent Application No. 60/694,255, filed Jun. 28, 2005.

The present invention relates to a method of preparing microfibrillar polysaccharide, particularly microfibrillar cellulose (MFC), microfibrillar polysaccharide obtainable from said method, and the use thereof.

BACKGROUND OF THE INVENTION

Microfibrillar cellulose (MFC), the most common microfibrillar polysaccharide, is prepared from wood fibres that have been delaminated to small fragments with a large proportion of the microfibrils of the fibre walls uncovered.

The produced MFC has a high specific surface area that imparts strong binding capacity in paper and fibre structures, high water retention, good stability in water dispersions as well as high viscosity.

The cellulose fibres can be delaminated to microfibrillar cellulose by enzyme treatment, especially by treatment with cellulases which is disclosed in WO 2004/055268. However, delamination of fibres by means of enzyme treatment is many times expensive and/or inefficient.

It would be desired to provide a method that could increase the production capacity in view of the prior art methods in which inter alia fibre clogging has impeded such attempts. It would also be desired to provide a method of preparing microfibrillar cellulose with an increased product consistency, i.e. to provide a suspension having a higher concentration of microfibrils without suffering from fibre clogging, increase in temperature and/or pressure resulting in interruption of the production. It is a further objective to provide a method of preparing MFC having an increased surface charge and stability in view of MFC products known in the art. The present invention intends to provide such a method.

THE INVENTION

The present invention relates to a method of preparing microfibrillar polysaccharide comprising treating a polysaccharide in an aqueous suspension comprising an oxidant and at least one transition metal, mechanically delaminating said polysaccharide such that microfibrillar polysaccharide is formed.

The term polysaccharide include, without limitation, cellulose, hemicellulose, chitin, chitosan, guar gum, pectin, alginate, agar, xanthan, starch, amylose, amylopectin, alternan, gellan, mutan, dextran, pullulan, fructan, locust bean gum, carrageenan, glycogen, glycosaminoglycans, murein, bacterial capsular polysaccharides, and derivatives thereof, with cellulose being preferred. The polysaccharide may be used as it is, or spinning may be used to generate or improve fibrous structure.

Cellulose is, however, the preferred polysaccharide for use in the present invention. Sources of cellulose for use in this invention include the following: (a) wood fibres, e.g. derived from hardwood and softwood, such as from chemical pulps, mechanical pulps, thermal mechanical pulps, chemical-thermal mechanical pulps, recycled fibres, newsprint; (b) seed fibres, such as from cotton; (c) seed hull fibre, such as from soybean hulls, pea hulls, corn hulls; (d) bast fibres, such as from flax, hemp, jute, ramie, kenaf, (e) leaf fibres, such as from manila hemp, sisal hemp; (f) stalk or straw fibres, such as from bagasse, corn, wheat; (g) grass fibres, such as from bamboo; (h) cellulose fibres from algae, such as velonia; (i) bacteria or fungi; and (j) parenchymal cells, such as from vegetables and fruits, and in particular sugar beets, and citrus fruits such as lemons, limes, oranges, grapefruits. Microcrystalline forms of these cellulose materials may also be used. Preferred cellulose sources are (1) purified, optionally bleached, wood pulps produced from sulfite, kraft (sulfate), or prehydrolyzed kraft pulping processes, (2) purified cotton linters, and (3) fruits and vegetables, in particular sugar beets and citrus fruits. The source of the cellulose is not limiting, and any source may be used, including synthetic cellulose or cellulose analogs.

According to one embodiment, the polysaccharide is treated in said aqueous suspension and delaminated simultaneously. This makes the method more time-efficient without deteriorating the quality of the product.

According to one embodiment, the polysaccharide is treated prior to delamination.

According to one embodiment, the treatment is carried out at acidic or neutral pH such as from about 1 to about 8, or from about 2 to about 6, or from about 3 to about 5 for a time sufficient to facilitate the delamination of the fibres of the polysaccharide. According to one embodiment, the treatment of polysaccharide is performed in the absence or substantial absence of any alkaline chemicals such as caustic soda or the like.

According to one embodiment, the oxidant is added in an amount of from about 0.1 to about 5, or from about 0.5 to about 3, or from about 0.5 to about 1.5 wt % based on the weight of polysaccharide.

A wide range of oxidants may be used of which radical generating oxidants are preferred. Examples of such oxidants include inorganic or organic peroxy compounds, ozone, ozonides like dimethyloxiran, halogen (e.g. chlorine or bromine) containing oxidants, oxygen. Inorganic peroxy compounds are particularly preferred and may, for example, be selected from hydrogen peroxide or hydrogen peroxide generating compounds like alkali metal salts of percarbonate, perborate, peroxysulfate, peroxyphosphate or peroxysilicate, or corresponding weak acids. Useful organic peroxy compounds include peroxy carboxylic acids like peracetic acid or perbenzoic acid. Useful halogen containing oxidants include alkali metal chlorite, alkali metal hypochlorite, chlorine dioxide and chloro sodium salt of cyanuric acid. It is also possible to use combinations of different oxidants. Further additives which may be added to the aqueous suspension include mineral acids such as hydrochloric acid. The concentration of such acid preferably is from about 0.1 to about 3, preferably from about 0.5 to about 1.5 Molar. Transition metals in ionic form can be added to the polysaccharide fibres before, after or simultaneously with the oxidant, for example in an aqueous solution. Examples of useful metals include iron, copper, manganese, tungsten and molybdenum, of which iron (e.g. $Fe^{2+}$ or $Fe^{3+}$) is particularly preferred. The metal ions may be used in the form of salts or complexes with common complexing agents such as EDTA, DTPA, phosphates or complexing agents based on phosphoric acid, oxalic acid, ascorbic acid, nitrite acetate, garlic acid, fulvic acid or polyoxomethalates. Further initiators which may be used include TAED, cyanamide and UV light. It is also possible to use combinations of different transition metals. The amount of transition metal employed depends on the amount of oxidant employed but is in most cases from about 0.000001 to about 20 or from about 0.00001 to about 5 or from about 0.0001 to about 1 wt % based on the weight of the oxidant.

In the case of iron ions and hydrogen peroxide the suitable amount of Fe is preferably from about 0.000001 to about 20 or from about 0.00001 to about 10 wt % based on the weight of the oxidant.

According to one preferred embodiment, the polysaccharide is treated with a solution of about 0.00001 to about 10 wt % $FeSO_4$ based on the weight of oxidant and from about 0.5 to about 1.5 wt % $H_2O_2$ based on the weight of the polysaccharide during 1 h at 70° C. and at pH 4.5.

The oxidant and the transition metal may be added to the polysaccharide dispersed in water, alcohol or any other suitable inorganic or organic solvent.

According to one embodiment, the dry weight of the aqueous polysaccharide suspension during the treatment is from about 5 to about 15, or from about 8 to about 12, or from about 9 to about 11 wt %.

According to one embodiment, the temperature in the aqueous suspension is from about 20 to about 100, more preferably from about 60 to about 80° C. According to one embodiment, the microfibrillar polysaccharide is delaminated for about 10 to about 120, or from about 20 to about 80, or from about 40 to about 60 minutes.

According to one embodiment, at least about 70, or at least about 80, or at least about 90 wt % of the polysaccharide is converted to microfibrillar polysaccharide.

As a complement to an added oxidant it is also possible to use ultrasonic sound or photo- or electro Fenton reactions (in situ generation of hydroxyl radicals by radiation or electric currents).

For purposes of the present invention polysaccharide microfibrils refer to small diameter, high length-to-diameter ratio substructures which are comparable in dimensions to those of cellulose microfibrils occurring in nature. While the present specification refers to microfibrils and microfibrillation, these terms are here also meant to include nanofibrils (cellulosic or other).

Cellulose being the preferred polysaccharide in accordance with the invention is found in nature in several hierarchical levels of organization and orientation. Cellulose fibres comprise a layered secondary wall structure within which macrofibrils are arranged.

Macrofibrils comprise multiple microfibrils which further comprise cellulose molecules arranged in crystalline and amorphous regions. Cellulose microfibrils range in diameter from about 5 to about 100 nanometers for different species of plant, and are most typically in the range of from about 25 to about 35 nanometers in diameter. The microfibrils are present in bundles which run in parallel within a matrix of amorphous hemicelluloses (specifically xyloglucans), pectinic polysaccharides, lignins, and hydroxyproline rich glycoproteins (includes extensin). Microfibrils are spaced approximately 3-4 nm apart with the space occupied by the matrix compounds listed above. The specific arrangement and location of the matrix materials and how they interact with the cellulose microfibrils is not yet fully known.

Preferably, the polysaccharide is delaminated to such an extent that the final specific surface area of the formed microfibrillar polysaccharide is from about 1 to about 100, or from about 1.5 to about 15, or from about 3 to about 10 $m^2/g$. The viscosity of the obtained aqueous suspension of microfibrillar polysaccharide suitably is from about 200 to about 4000, or from about 500 to about 3000, or from about 800 to about 2500 mPas. The stability, which is a measure of the degree of sedimentation of the suspension preferably is from about 60 to 100, or from about 80 to about 100%, where 100% indicates no sedimentation for a period of at least 2 weeks (6 months).

Microfibrillar polysaccharides produced according to the present invention suitably have a length of from about 0.05 to about 0.9, or from about 0.1 to about 0.5, or from about 0.2 to about 0.3 mm.

Non-delaminated wood fibres, e.g. cellulose fibres, are distinct from microfibrillar fibres because the fibre length of wood fibres ranges usually from about 0.7 to about 2 mm. The specific surface area of such fibres usually is from about 0.5-1.5 $m^2/g$.

Delamination can be carried out in various devices suitable for delaminating the fibres of the polysaccharides. The prerequisite for the processing of the fibres is that the device is capable or is controlled in such way that fibrils are released from the fibrewalls. This may be accomplished by rubbing the fibres against each other, the walls or other parts of the device in which the delamination takes place. Preferably, the delamination is accomplished by means of pumping, mixing, heat, steam explosion, pressurization-depressurization cycle, impact, grinding, ultrasound, microwave explosion, milling, and combinations thereof, most preferably the mechanical delamination is performed by grinding, milling or combinations thereof. In any of the mechanical operations disclosed herein, it is important that sufficient energy is applied such that microfibrillar polysaccharide is produced. The invention also relates to microfibrillar polysaccharide obtainable by the method as disclosed herein. Preferably, the microfibrillar polysaccharide comprises microfibrillar cellulose, most preferably microfibrillar cellulose derived from an unbleached pulp. The microfibrillar cellulose may be used in any of the various applications known in the art.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. While the examples here below provide more specific details of the reactions, the following general principles may here be disclosed. The following examples will further illustrate how the described invention may be performed without limiting the scope of it.

All parts and percentages refer to part and percent by weight, if not otherwise stated.

EXAMPLE 1 a) The pulp used in the experiments was a bleached sulphite pulp from Domsjö (15% hemicellulose content) intended for paper production.
  1. Reference Domsjö sulphite pulp
  2. Pre-treated Domsjö sulphite pulp: The conditions used in the pre-treatment step were: 10% pulp consistency, 0.01% $FeSO_4$ based on the weight of dry pulp, 1% $H_2O_2$ based on the weight of dry pulp, 1 h at 70° C. and pH 4.5, adjusted with sulphuric acid.

b) MFC was produced from pulp samples 1 and 2 by passing a fiber suspension of 1% through a pearl-mill (Drais PMC 25TEX) under the following conditions: Zirkonium oxide pearls (65% filling grade), rotor speed of 1200 revolutions/minutes and a flow rate of 100 l/h. Energy demand and runnability were noted during the trials.

c) The MFC products from trial b) were passed another time through the mill and at the same conditions except for the flow rate which was 200 l/h.

d) The following MFC product properties were characterized: fiber length, viscosity, water retention value (WRV), stability, and charge. The results can be seen in Table 1.

TABLE 1

Energy demand and characteristics of the MFC products produced from a bleached sulphite pulp from Domsjö (15% hemicellulose content).

| | Ref MFC Passage 1 | Redox MFC Passage 1 | Ref MFC Passage 2 | Redox MFC Passage 2 |
|---|---|---|---|---|
| Energy (kWh/ton) | 8561 | 5299 | 12842 | 7924 |
| Fiber length (mm) | 0.37 | 0.24 | 0.28 | 0.25 |
| WRV (g/g) | 4.78 | 4.42 | 5.10 | 5.39 |
| Viscosity (mPas) | 1486 | 1035 | 1839 | 1098 |
| Stability (%) | 100 | 100 | 100 | 100 |
| Z-potential (mV) | −52.5 | −64.9 | −81.3 | −101.8 |

EXAMPLE 2 a) The pulp used in the experiments was an unbleached softwood kraft pulp from Södra Cell AB intended for the production of fully bleached pulp.
   1. Reference Värö kraft pulp
   2. Pre-treated Värö kraft pulp: The conditions used in the pre-treatment step were: 10% pulp consistency, 0.01% $FeSO_4$ based on the weight of dry pulp, 2% $H_2O_2$ based on the weight of dry pulp, 1 h at 70° C. and pH 4.5, adjusted with sulphuric acid.
b) MFC was produced from pulp samples 1 and 2 by passing a fiber suspension of 1% through a pearl-mill (Drais PMC 25TEX) under following conditions: Zirkonium oxide pearls (65% filling grade), rotor speed of 1200 revolutions/minutes and a flow rate of 100 l/h. Energy demand (see Table 2) and runnability were noted during the trials.
c) The MFC products from trial b) were passed another time through the mill and at the same conditions except for the flow rate which was 200 l/h.
d) The following MFC product properties were characterized: WRV, viscosity, stability and Z-potential (see Table 2)

TABLE 2

The energy demand and characteristics of the MFC products produced from an unbleached softwood kraft pulp from Värö.

| | Ref MFC Passage 1 | Redox MFC Passage 1 | Ref MFC Passage 2 | Redox MFC Passage 2 |
|---|---|---|---|---|
| Energy (kWh/ton) | 8692 | 5276 | 12810 | 8042 |
| Fiber length (mm) | 0.37 | 0.34 | 0.30 | 0.29 |
| WRV (g/g) | 5.99 | 4.59 | 4.14 | 4.00 |
| Viscosity (mPas) | 2160 | 2302 | 1424 | 805 |
| Stability (%) | 100 | 100 | 100 | 100 |
| Z-potential (mV) | −49.4 | −69.1 | −46.0 | −61.5 |

EXAMPLE 3 a) The pulp used in the experiments was a dissolving sulphite pulp from Domsjö (5% hemicellulose content).
   1. Reference Domsjö dissolving pulp (5% hemicellulose)
   2. Reference Domsjö dissolving pulp (5% hemicellulose) with addition of 0.1% carboxymethylcellulose (Akucell AF 1985, DS: 0.85 and MW: 340,000)
   3. Pre-treated Domsjö dissolving pulp (5% hemicellulose). The conditions used in the pre-treatment step were: 10% pulp consistency, 0.01% $FeSO_4$ based on the weight of oxidant, 1% $H_2O_2$ based on the weight of dry pulp 1 h at 70° C. and pH 4.5, adjusted with sulphuric acid.
   4. Pre-treated Domsjö dissolving pulp (5% hemicellulose) as in point 3 with addition of 0.1% carboxymethylcellulose (Akucell AF 1985, DS:0.85 and MW: 340,000).
b) MFC was produced from pulp samples 1 and 2 by passing a fiber suspension of 1.5% through a pearl-mill (Drais PMC 25TEX) under the following conditions: Zirkonium oxide pearls, 65% filling grade, rotor speed 1200 revolutions/minutes and flow rate 100 l/h. Energy demand and runnability were noted during the trials.
c) The MFC products from trial b) were passed another time through the mill and at the same conditions except for the flow rate which was 200 l/h.

TABLE 3

Total energy consumption for producing MFC from a sulphite pulp from Domsjö (5% hemicellulose content).

| Pulp | Passage 1 (kWh/ton) | Passage 2 (kWh/ton) |
|---|---|---|
| Reference pulp | 5956 | 8934 |
| Reference pulp + CMC addition | 4992 | 7626 |
| Pre-treated pulp | 3712 | 5692 |
| Pre-treated pulp + CMC addition | 3941 | 5875 |

Microfibrillated cellulose having an arithmetic average fiber length of 0.23 to 0.37 mm, a water retention value of at least 400% and high stability have been produced. The MFC products produced from the redox treated pulp have a higher charge (Z-potential) compared to the reference products. The energy demand decreased by about 40% when the pulps were pretreated with the Fenton's reagent. Furthermore, the runnability of the pearl-mill was improved (no clogging, temperature or pressure stop). Similar trends in the results are obtained for the trials with the unbleached softwood kraft pulp and bleached dissolving pulp. The viscosity of the bleached sulphite pulp (15% hemicellulose content) and unbleached kraft pulp decreased by 47 to 66% when subjected to the pre-treatment (cf. Table 4).

TABLE 4

Characteristics of the sulphite pulp (15% hemicellulose content) and unbleached kraft pulp used in the investigation.

| | Domsjö reference pulp | Domsjö redox pulp | Värö reference pulp | Värö redox pulp |
|---|---|---|---|---|
| Viscosity ($dm^3$/kg) | 998 | 531 | 1193 | 397 |
| WRV (g/g) | 1.49 | 1.60 | 1.46 | 1.50 |
| Fiber length (mm) | 0.91 | 0.92 | 1.12 | 1.18 |
| Z-potential (mV) | −18.2 | −17.0 | −19.4 | −10.8 |

The invention claimed is:

1. A method of preparing microfibrillar polysaccharide comprising treating a polysaccharide in an aqueous suspension comprising an oxidant and at least one transition metal in ionic form, mechanically delaminating said polysaccharide such that microfibrillar polysaccharide is formed, wherein the transition metal is added to the polysaccharide in the form of a salt or metal ion complex.

2. A method of preparing microfibrillar polysaccharide comprising treating a polysaccharide in an aqueous suspension comprising an oxidant and at least one transition metal, mechanically delaminating said polysaccharide such that microfibrillar polysaccharide is formed, wherein said aqueous suspension has a pH from about 3 to about 5.

3. A method of preparing microfibrillar polysaccharide comprising treating a polysaccharide in an aqueous suspension comprising an oxidant and at least one transition metal, mechanically delaminating said polysaccharide such that microfibrillar polysaccharide is formed, wherein the oxidant is present in an amount of from about 0.1 to about 5 wt % based on the weight of polysaccharide.

4. A method according to claim 1, wherein the polysaccharide is treated in said aqueous suspension and delaminated simultaneously.

5. A method according to claim 1, wherein the aqueous suspension has a temperature from about 20 to about 100° C.

6. A method according to claim 1, wherein the microfibrillar polysaccharide is delaminated for from about 10 to about 120 minutes.

7. A method according to claim 1, wherein at least 70 wt % of the polysaccharide is converted to microfibrillar polysaccharide.

8. A method according to claim 1, wherein the polysaccharide comprises cellulose fibers.

9. A method according to claim 1, wherein the polysaccharide is treated at a pH from about 3 to about 5.

10. A method according to claim 1, wherein said at least one transition metal is present in the aqueous suspension in an amount of from about 0.000001 to about 50 wt % based on the weight of the oxidant.

11. A method according to claim 1, wherein the oxidant is present in the aqueous suspension in an amount of from about 0.1 to about 5 wt % based on the weight of polysaccharide.

12. A method according to claim 1, wherein the polysaccharide is delaminated by means of pumping, mixing, heat, steam explosion, pressurization-depressurization cycle, impact, grinding, ultrasound, microwave explosion, milling, and combinations thereof.

13. A method according to claim 1, wherein the oxidant is hydrogen peroxide and the transition metal is iron.

14. A method according to claim 1, wherein the aqueous suspension has a dry content of polysaccharide from about 5 to about 15 wt %.

15. A method according to claim 2, wherein the transition metal is in ionic form.

16. A method according to claim 3, wherein the transition metal is in ionic form.

* * * * *